United States Patent

[11] 3,564,251

| [72] | Inventor | Arthur H. Youmans |
| | | Houston, Tex. |
| [21] | Appl. No. | 710,303 |
| [22] | Filed | Mar. 4, 1968 |
| [45] | Patented | Feb. 16, 1971 |
| [73] | Assignee | Dresser Industries, Inc. |
| | | Dallas, Tex. |

[54] CASING INSPECTION METHOD AND APPARATUS
12 Claims, 9 Drawing Figs.

[52] U.S. Cl................................................. 250/83.3D,
250/71.5
[51] Int. Cl...................................................... G01t 1/16,
G01t 1/20
[50] Field of Search........................................ 250/83.3
(D), 83.6 (W), 108; 313/78

[56] References Cited
UNITED STATES PATENTS

| 2,316,361 | 4/1943 | Piety............................ | 250/108X |
| 2,465,380 | 3/1949 | Labin et al.................... | 313/78X |
| 2,940,302 | 6/1960 | Scherbatskoy................ | 250/83.3X |

Primary Examiner—Ralph G. Nilson
Assistant Examiner—Davis L. Willis
Attorneys—Robert W. Mayer, Daniel Rubin, Peter J. Murphy, Frank S. Troidl, Roy L. Van Winkle and William E. Johnson, Jr.

ABSTRACT: Methods and apparatus for the inspection of casing, pipe lines, tanks, or the like are disclosed. The internal surface thereof is scanned with an x-ray beam. The intensity of the resulting scattered x-rays is measured, displayed and recorded in correlation with the scan as a measure of the condition of the surface or the thickness of the scanned material.

PATENTED FEB 16 1971
3,564,251
SHEET 2 OF 2
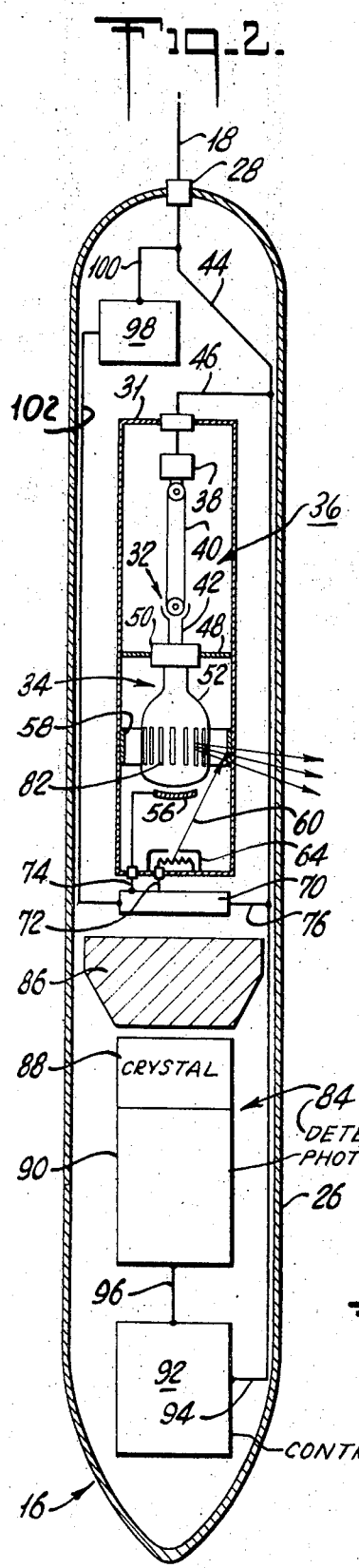
Fig.2.
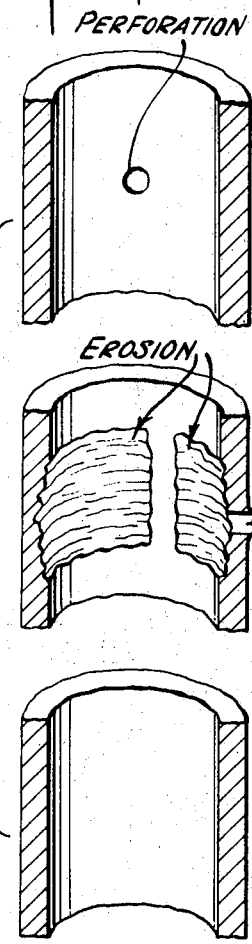
Fig.5A.
PERFORATION
EROSION
PERFORATION
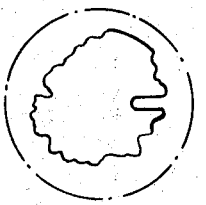
Fig.5B.
OSCILLOSCOPE SCREEN
SWEEP TRACE ON THE SCREEN
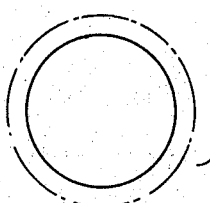
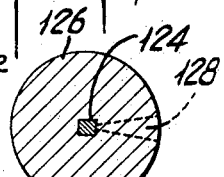
Fig.7.
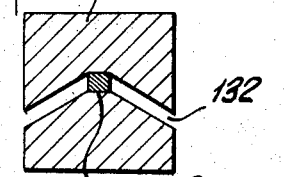
Fig.8.
124, GAMMA SOURCE
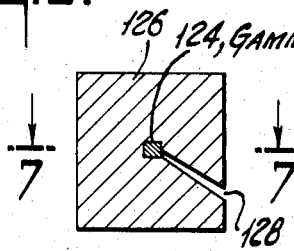
Fig.6.
126  124, GAMMA SOURCE
INVENTOR
ARTHUR H. YOUMANS
BY William E. Johnson Jr
ATTORNEY

CASING INSPECTION METHOD AND APPARATUS

BACKGROUND OF THE INVENTION

This invention, generally, relates to the art of geophysical prospecting and, in particular, to the art of radioactivity well logging and, even more particularly, to the art of inspection in a cased well.

It has long been known that the casing used in oil wells, as well as the tubing used within the wells, is subjected to corrosion and that such corrosion sometimes becomes sufficiently extensive that the casing or the tubing fails catastrophically. Such failures can occur during production, but more commonly, they occur during recompletion or stimulation operations on the well. Tubing failures due to corrosion can result in the lower portion of the tubing actually falling to the bottom of the well. On the other hand, casing failures due to corrosion generally cause less dramatic, but still significant, effects, such as changes in the productive rate or potential of the well by permitting the cased-off formations to slough into the well bore, or permitting cased-off water to enter the well bore, or permitting the loss of produced oil into the formation exposed through the failure, or the like.

There are ways today that casing or tubing may be inspected periodically, such as by lowering calipering devices or magnetic inspection devices into the casing or tubing. These techniques are still valuable and worthwhile field services. However, their nature is such that detailed peripheral and longitudinal inspections or comparisons are not possible. The present invention, however, is particularly adaptable for use in those occasions where a detailed inspection of the casing is desired in both the peripheral and the longitudinal directions.

SUMMARY OF THE INVENTION

Briefly, the method of inspecting the internal surface of a conduit or tank, in accordance with the principles of the present invention, involves the moving of a radiation beam source along the length of the conduit while rotating the radiation beam in a plane transverse to the axis of movement. The intensity of radiation, scattered by the conduit, is detected at a point spaced a predetermined distance from the source, and a signal is generated that is proportional to the detected radiation intensity. The generated signal is displayed in correlation with the angular displacement of the rotating radiation beam, and selected portions of the signal are recorded in correlation with the angular and longitudinal displacement of the source. For most effective operation, the radiation beam should be directed at an acute angle, rather than transverse, to the axis of movement of the logging instrument. In this form, the radiation beam is rotated along a conical surface about the axis of movement.

While apparatus to carry out the method in accordance with the invention may include any of the several forms of radiation energy sources, a presently preferred form uses a source of x-rays.

OBJECTS OF THE INVENTION

An object of this invention is to provide method and apparatus for inspecting the internal surface of oil field tubular goods, either installed in the earth or on the earth's surface, and to provide a record of the complete inspection.

Another object of the present invention is to provide method and apparatus for selectively displaying and/or recording a representation of the internal surface of tubular goods in either a point-to-point fashion around the internal circumference of the goods as a function of depth (length) or an integrated representation of the circumferential condition as a function of depth.

Other objects, features and advantages of the invention will be appreciated from a reading of the following detailed description and accompanying drawings, which disclose, by way of example, the principles of the invention and the best modes, which have been contemplated, of applying those principles.

BRIEF DESCRIPTION OF THE DRAWINGS

For purposes of simplification the description of this invention will be in terms of its use to inspect the casing in a cased well and the drawings show forms of the apparatus particularly suitable for such use. Other forms of apparatus will be discussed also hereinafter.

FIG. 2 is a partly schematic and partly cross-sectional representation of one embodiment of the subsurface instrument suitable for use in this invention;

FIG. 3 is a representation partly in perspective of a portion of subsurface apparatus;

FIG. 4 is a cross-sectional view of the target for an x-ray source;

FIG. 5A is a representation of typical sections of casing in a cased well;

FIG. 5B shows typical displays or records of the inspection made at depths corresponding to the typical sections of casing shown in FIG. 5A;

FIG. 6 is a cross-sectional view of one embodiment of a gamma ray source suitable for use in another form of apparatus in accordance with this invention;

FIG. 7 is another cross-sectional view of the gamma ray source shown in FIG. 6; and FIG. 8 is a cross-sectional view of another radiation source suitable for use in still another form of apparatus in accordance with this invention.

DESCRIPTION OF THE PREFERRED EMBODIMENTS

Figure 1:
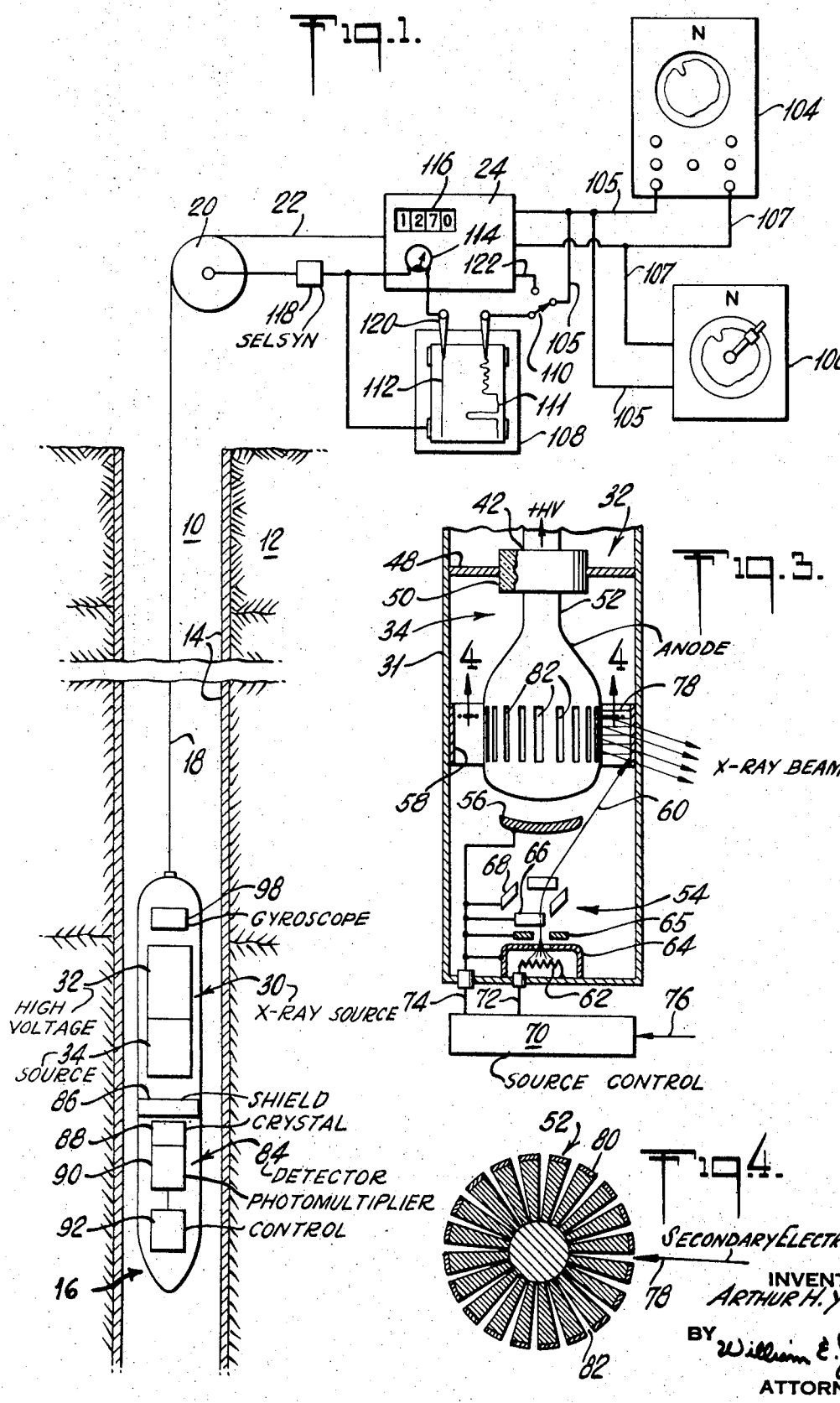
FIG. 1 is a schematic representation of an overall apparatus constructed in accordance with the principles of the present invention.

It is known that x-rays and relatively soft gamma rays, when directed to a target surface, are scattered in proportion to the number of electrons per unit volume that is exposed to the primary beam of radiation. For the common metallic materials used in tubular goods, the number of electrons per unit volume is directly related to the density of the surface material. For radiations of x-rays and gamma rays with energies such that only a relatively small fraction of the radiation will pass through the target material when the beam is incident normal to the surface, this scattering density is directly related to the thickness of the material. Thus, the measurement of the scattered radiation intensity relative to the primary intensity is a measure of the thickness of the target material. Where the target material is the casing in a cased well, the measurement of the relative scattered radiation intensity is a measurement of the effective thickness of the casing and, hence, is an indication of the extent of any corrosion or other effects that has taken place which may have reduced the local thickness.

An accelerator, such as that shown in U.S. Pat. No. 2,689,918, is modified to produce x-rays, in accordance with a presently preferred form of this invention. The accelerator tube portion of that accelerator is evacuated and an electron gun is placed on the tube axis in such a position that the electron beam can strike at points along a circle in the plane of the central electrode. Along this circle is placed a strip of secondary emissive material such as beryllium-copper or one of the more complex secondary emission materials such as a surface layer of cesium deposited on a base of oxidized silver, beryllium, or zirconium. Deflecting plates surrounding the electron gun control the electron beam and cause it to rotate at constant angular velocity around the tube axis. The central electrode is maintained at a potential of about one hundred to three hundred kilovolts positive and is constructed of materials with high atomic number, such as tungsten, tantalum, rhenium, uranium or gold. The secondary electron current produced by the rotating electron beam is accelerated to the central electrode, or anode, where x-rays are produced, primarily at the bottom of slots in the anode. The anode is supplied with slots which collimate the beam of x-rays into a relatively narrow beam, both transversely and longitudinally, with its center line directed at an acute angle with respect to a plane transverse to the well. Thus, rotation of the electron beam causes rotation of the secondary electrons and hence rotation of the x-ray beam produced by interaction of the secondary electrons with the anode. Since the x-ray beam is directed at an acute angle with respect to a plane transverse to the well, the beam will rotate along a conical surface about the axis of the well.

A key element of the apparatus of this invention is a rotating, collimated beam of radiation, such as x-rays or relatively soft gamma rays. When gamma rays are desired as the radiation source, a radioactive source which emits gamma rays is used. On the other hand, x-rays are generated by accelerating electrons through potential differences of about one hundred kilovolts and, then, allowing them to strike a high atomic-number target. A collimated x-ray beam, which rotates about the axis of the cased well, is developed by means of a scanning beam of electrons which hits a special target, as described hereinafter.

When an x-ray source is used to inspect the well casing, the x-ray beam scans the internal circumference of the casing as the source is moved. An x-ray detector is spaced at a predetermined longitudinal distance from the x-ray source to measure the intensity of the x-rays that are scattered from the casing. A signal is generated by this detector and is transmitted to the surface of the earth for recording in correlation with the angular displacement of the x-ray beam. When desired, a record may be made of such inspection by taking a photograph of a cathode ray oscilloscope display with an appropriate note of the depth at which the inspection was made or, in the alternative, a pen-and-ink or photographic recorder adapted to record in polar coordinates may be used to make such a record. Another alternative means for recording the results of the inspection is to traverse the x-ray source and detector through the well at a constant speed and record the detector signal as a function of time on a strip chart recorder, so that the time may be correlated with the angular displacement of the x-ray beam and the depth of the x-ray source in the well.

In the form of the invention illustrated in FIG. 1, a well 10 is shown penetrating the earth formations 12 and lined with a casing 14. A subsurface instrument 16 is moved through the well 10 by a conventional hoist 20 driven by a suitable power unit (not shown). A logging cable 18 has sufficient strength to suspend the subsurface instrument 16 from the hoist 20 and includes electrical conductors to carry the necessary electrical power from the surface apparatus to the subsurface unit instrument 16 and to carry electrical signals generated within subsurface instrument 16 to the surface apparatus.

A logging unit 24 includes the electrical power supplies necessary for the surface and for the subsurface apparatus and, in addition, includes the necessary processing circuits for the electrical signals received from the subsurface instrument 16. The circuit diagrams for the power supplies and processing circuits are not shown since the ordinary mechanic in this art has many suitable circuits available to him; the only requirements are that they be compatible with the rest of the apparatus and perform the necessary functions.

In FIG. 2, a specific embodiment of a suitable subsurface instrument 16 is illustrated. This instrument 16 includes a housing 26 which is constructed to withstand the well pressure and the mechanical abuse it will be subject to during logging operations. A cable head 28 connects the housing 26 to the cable 18 and also includes the appropriate sealing means and insulated feed-through connections from the electrical conductors of the cable 18 to the electrical circuits 44 within housing 26.

An x-ray source 30 is supported within an inner housing 31 in the housing 26, and the inner housing 31 is divided into a high voltage compartment 32 and a source compartment 34. Preferably, the source 30 is a modification of the ion accelerator of U.S. Pat. No. 2,689,918 and the neutron source of U.S. Pat. No. 2,960,610. The modification consists of substituting an electron source for the positive-ion source and a heavy metal target for the hydrogen isotope target and the associated adaptations. Thus, the positive ion accelerator is transformed into an electron accelerator which produces x-rays rather than neutrons.

A high voltage power supply 36 is in the form of a Van de Graaff generator, which is shown schematically as including a motor 38, a belt 40 and a high voltage terminal 42. Electrical power for the Van de Graaff generator is supplied from the logging unit 24 over circuit 22, the logging cable 18, and circuits 44 and 46.

The x-ray source housing 31 generally will be provided with a threaded joint so that the two compartments 32 and 34 may be separated for convenience in the maintenance of the source 30. The compartment 32 of the housing 31 contains an electrically insulating gas which is necessary for the proper operation of the high voltage power supply 36. The source compartment 34 is constructed to permit evacuation of the compartment 34, since the presence of appreciable amounts of gas in this compartment would interfere with the transmission of various electron beams.

Further, the compartment 34 is constructed of light metals, such as beryllium, magnesium, aluminum, or titanium or their alloys, so that the intensity of the x-rays will not be reduced unduly in passing through the housing. A barrier 48, which separates the inner housing 31 into the two compartments 32 and 34, contains a sealed high voltage feed-through connection 50, which connects a high voltage terminal 42 with an anode 52. In addition to the anode 52, the source compartment 34 contains an electron gun 54 (see FIG. 3), an electrostatic shield 56 and an electron target 58 composed of secondary emission material.

The electron gun 54, seen better in FIG. 3, generates a primary beam 60 of electrons and is composed generally of a filament 62, focusing electrode structure 64 and two pairs of deflecting plates 66 and 68. The electrical connections to these elements are through the inner housing 31 and are shown schematically for purposes of simplification of the drawings. These elements 62, 64, 66 and 68 are connected to an x-ray source control unit 70 by means of circuits 72 and 74. Operating signals and electrical power are transmitted from the logging unit 24 to the x-ray source control unit 70 by way of the electrical circuit 22, the cable 18 and the circuits 44 and 76.

When the production of x-rays is desired, the x-ray source 30 is energized by an operating signal from the source control unit 70. Electrical power then is sent from the control unit 70 over the circuit 72 to the filament 62, whereby the filament is heated and becomes a source of electrons which are withdrawn from the vicinity of the filament 62 and focused into an electron beam by the focusing electrode structure 64 (the beam is on the axis of the x-ray source). The appropriate electrical voltages for achieving this focusing action are transmitted over the circuit 74 from the control unit 70 to the focusing electrode structure 64. The focused electron beam then is accelerated by the electrical field developed by the application of a potential difference of a few hundred volts between the focusing electrode 64 and the accelerating electrode 65, so that the focused electron beam becomes the primary beam 60 of electrons. An accelerating voltage is applied to the focusing electrode 64 and to the accelerating electrode 65 over the circuit 74 from the control unit 70.

A sinusoidal voltage is applied to each pair of the deflecting plates 66 and 68 from the control unit 70 over the circuit 74 to cause the primary electron beam 60 to be bent away from the axis of the x-ray source 30 and to rotate about this axis with constant angular speed. By selecting the deflecting voltage in accordance with (1) the geometrical design of the electron gun 54, (2) the geometry of the other elements in the compartment 34, and (3) the accelerating voltage, the primary electron beam 60 is caused to impinge upon the secondary emission target 58 and to sweep around the target 58 repeatedly. Each complete sweep takes a time interval equal to the period of the AC voltages applied to the deflecting plates 66 and 68.

The secondary emission target 58 acts as the source of electrons to be accelerated to the anode 52 and thereby generate x-rays. These electrons form a secondary electron beam 78 which rotates around the axis of the x-ray source 30 in correlation with the rotation of the primary electron beam 60.

Some of the preferred materials for the secondary emission target 58 are beryllium-copper alloys or one of the more complex materials such as a surface layer of cesium deposited on a base of oxidized silver, beryllium, or zirconium. Materials of this nature are preferred because they have relatively high secondary emission ratios, i.e., the number of secondary electrons is appreciably greater, for example, four times or more, than the number of primary electrons.

To increase the energy and the intensity of the x-rays, it is necessary to accelerate the secondary electron beam 78 to the maximum velocity before the electrons strike the anode 52. This may be achieved by electrically connecting the secondary emission target 58 to the housing 31 of x-ray source 30, whereby the full voltage generated by the Van de Graaff generator is effective.

An electrostatic shield 56 is interposed between anode 52 and electron gun 54 so that the electric field generated when the high voltage is applied to the anode 52 will have no appreciable effect on the operation of the electron gun 54 and so that the primary electron beam 60 will be shielded from the anode 52. The electrostatic shield 56 is electrically connected to ground, or to a voltage with polarity that is negative with respect to ground, by means of a circuit 74, between the shield 56 and the control unit 70.

As best seen in FIGS. 3 and 4, the anode 52 is constructed of a material with a high atomic number, such as tungsten, tantalum, rhenium, uranium or gold, because such materials develop x-rays when struck by electrons. However, the outer surface of the anode 52 is coated with a suitable material 80 which has a low atomic number, such as beryllium or carbon, and a plurality of slots 82 are formed about the circumference of the anode 52 to permit the secondary electron beam 78 to strike the inner material to produce relatively narrow, well collimated beams of x-rays.

Referring back to FIG. 2, an x-ray detector 84 is spaced longitudinally from the source 30 within the housing 26. A radiation shield 86 is positioned between the detector 84 and the source 30 and is composed of a suitable material, such as lead or a tungsten alloy, so that the detector 84 is sensitive primarily to radiation from a lateral direction. The detector 84, preferably is a scintillation counter which includes a scintillation crystal 88 of sodium activated cesium iodide or thallium activated sodium iodide and a photomultiplier tube 90.

Since the intensity of the x-rays scattered by the casing 14 and detected by the scintillation counter is relatively high, it is unnecessary to count individual pulses corresponding to individual scattered x-rays, but instead, the integrated photomultiplier tube anode current is amplified in a detector control unit 92 and is prepared for transmission to the logging unit 24 at the surface over circuits 94 and 44, the logging cable 18, and the circuit 22. The electrical power for operating the detector control unit 92 is transmitted from logging unit 24 over this same path. This electrical power also is converted within the control unit 92 to the necessary voltages for operating the photomultiplier tube 90 and is connected thereto over circuit 96. These circuits also provide the electrical path for the output signal from the photomultiplier tube.

Since there is no assurance that the subsurface instrument 16 will retain the same orientation with respect to the circumference of casing 14 during an entire logging operation, a north-pointing gyroscope 98 is included within the instrument 16. Power to the gyroscope 98 is furnished from the logging unit 24 over the electrical circuit 22, the logging cable 18, and circuits 44 and 100. The output signal of the gyroscope 98 is transmitted to the source control unit 70 by means of electrical circuit 102.

Within the control unit 70, the gyroscope output signal is compared with the electrical phase angles of the deflecting voltages used in the electron gun 54 to generate a signal which is indicative of the angular displacement of the primary electron beam 60 (and thus the x-ray beam) from the North direction. Hereinafter, the angular displacement signal will sometimes be called the "directional signal."

The directional signal is transmitted to the logging unit 24 at the surface over circuits 76 and 44, the logging cable 18, and the electrical circuit 22. At the surface, the output signal of the x-ray detector 84 and the directional signal are processed in the logging unit 24 and transmitted to an oscilloscope 104 and/or a polar recorder 106 over circuits 105 and 107, respectively, so that the output signal of the x-ray detector 84 is displayed and/or recorded in a polar coordinate system. In such a coordinate system, the intensity of the scattered x-rays is plotted radially, with the minimum intensity at the center and the maximum at the outside edge of the display, in correlation with the angular displacement of the primary electron beam 60 from North. In FIG. 1, the North reference direction is arbitrarily illustrated with the index N on the displays of the oscilloscope 104 and of the recorder 106.

The displays on the oscilloscope 104 and/or the polar recorder 106 will be stable only while the subsurface instrument 16 is stationary in the well 10 so that the same portion of the casing is being inspected repeatedly. When a permanent record of a complete casing inspection is required, a strip chart recorder 108 is used.

The strip chart of the recorder 108 is driven as a function of time so that the record may be correlated with both the depth of the subsurface instrument 16 in the well 10 and with the directional signal. The input to the recorder 108 is connected through a switch 110 and the circuit 105 to the output of the logging unit 24, and such input corresponds to the intensity of the scattered x-rays, i.e., to the output of the detector 84, so that a record 111 of the detector output is made as a function of time.

To improve the correlation of the time drive and the depth of the instrument 16, there is illustrated in FIG. 1, a means for recording, directly on the recorder 108, a record 112 of the actual logging speed at which the instrument 16 is withdrawn from the well. Therefore, the correlation may be corrected for variations in the logging speed. This recording means includes a logging speed computer and display 114 within the logging unit 24.

The input to this computer is an electrical signal representing the rotation of a calibrated sheave (within the hoist unit 20), which is driven by the logging cable 18 in correlation with the depth of the subsurface instrument 16 within the well 10. Such sheave-rotation signals are commonly used in the industry to drive an odometer 116 (within the logging unit 24) to visually indicate the depth of the instrument 16 within the well 10. This odometer signal is generated by a Selsyn servomechanism driven by the calibrated sheave.

The logging speed computer 114 differentiates this odometer signal with respect to time and multiplies the result by the appropriate constant to provide a signal proportional to the logging speed. The logging speed signal, in turn, is transmitted to an input terminal 120 of the recorder 108 for recording as a function of time, such as illustrated by the record 112.

The sweep speed of the primary electron beam 60 may be varied by varying the frequency of the AC voltages applied to the deflecting plates within electron gun 54. The sweep speed is selected to give the desired depth and circumferential resolution on the record 111. For example, the x-ray beam may rotate once for each 2 inches of axial movement of the instrument 16. This corresponds to 6 revolutions per foot which, at a logging speed of 20 feet per minute, gives a sweep frequency of 120 r.p.m. or 2 revolutions per second. In a casing 8 inches in diameter, the beam would move along a 25-inch peripheral path in one-half second, requiring that the detector 84 have a response time of about one twenty-fifth second to attain a 2-inch peripheral resolution.

A one twenty-fifth second response time is not attainable with a conventional pen-and-ink strip chart recorder but can be employed readily with either photographic recorders or tape recorders. The detector 84 can produce a signal in one twenty-fifth second, which is statistically accurate to 3 percent, if x-rays are detected at a rate of about 1000 per one twenty-fifth second or 25,000 per second ($1.5 \times 10^6$ cpm). This counting rate can be obtained easily even with a capsule source of gamma rays and can certainly be exceeded with an accelerator operated as described herein.

If it is desired to obtain a record of an inspection of the casing 14 as a function of depth only, i.e., without the complete and detailed circumferential inspection, an output connection 122 is provided in the logging unit 24. The processing circuits within the logging unit 24 provide, at this output, an electrical signal proportional to the integrated scattered x-ray intensity signal from the detector 84, where the integration interval is one complete revolution of the primary electron beam 60. A record of this signal may be made by driving the strip chart of recorder 108 as a function of depth by means of the previously described odometer signal and switching the input to the recorder, by means of the switch 110, from the circuit 105 to the output 122.

In FIG. 5A, three typical conditions of the internal surface of a casing are illustrated. The three are: a noncorroded portion, a portion in which a fraction of a circumferential zone has been eroded away by corrosion and that same fraction also contains a perforation, and a noncorroded portion which contains a perforation.

FIG. 5B illustrates the displays that inspections of these typical portions made in accordance with this invention would give on the oscilloscope 104 and/or on the polar recorder 106.

In view of the above explanation of this invention, those familiar with the radioactivity well logging art will readily recognize that there are many alternative apparatus which may be used in performing the method of this invention. For example, they will recognize that the x-ray source could be replaced with an appropriately shielded source of low energy gamma rays, without departing from the spirit and scope of the invention, and still accomplish equivalent results. Examples of such shielded sources are illustrated in FIGS. 6, 7, and 8. Among the suitable sources of low energy gamma rays are cerium-144 and iridium-192.

FIGS. 6 and 7 are two views of a form of such a shielded source. A low energy gamma ray source 124 is enclosed in a radiation shield 126 of a heavy metal, such as lead or a tungsten alloy. A slot or channel 128 is formed in the shield 126 so that a collimated beam of low energy gamma rays may emerge and be scattered by the internal surface of the casing. Rotation of the collimated beam of gamma rays is accomplished by a motor (not shown) operatively coupled to the source 126.

FIG. 8 illustrates a suitable substitute for the x-ray source when a detailed circumferential inspection of the casing is not required. In this embodiment, a low energy gamma ray source 124 is enclosed in a radiation shield 130 made of a heavy metal, such as lead or a tungsten alloy. A conical channel 132 is formed in the radiation shield 130 so that a collimated beam of low energy gamma rays may emerge and be scattered by the complete circumference of the casing.

Other alternative devices which will occur to those skilled in this art include, as a substitute for the electron gun 54, a rotating light beam which is directed to strike a photoemissive surface surrounding the anode 52, rather than the secondary emission target 58. Also, a circumferential cathode may be employed with a multiplicity of control grids as a substitute for the rotating beam 78 of secondary electrons.

The peripheral, spiral path of the x-ray beam is much longer than the lineal well depth, and it will often be inconvenient to have a very long strip chart record of the inspection where large fractions of the record are monotonous repetitions of indications of undamaged casing. In such circumstances it may be preferred to record a signal somewhat analogous to the well-known casing collar log on the recorder 108, instead of the record 111, where no signal at all is indicated unless an anomalous increase or decrease in the intensity of the scattered x-rays occurs, indicating a variation in the casing thickness.

Similarly, it may be preferred to locate and verify the existence of perforations in the casing. For such purposes, visual observation of the oscilloscope 104 and the odometer 116 may be preferred to a permanent record, since perforations will be indicated by very distinctive changes in the intensity of the scattered x-rays. Of course, it is possible to make a record on the strip chart recorder 108 of only the perforations as a function of depth.

Those familiar with the radioactivity well logging art will also recognize that the apparatus of this invention may also be used to inspect the wall of an uncased well. When so used the displays and records will indicate the presence of fractures, vugs, cavities, etc. or generally the contour of well wall. When used for this purpose, it will often be desirable to keep the subsurface instrument centralized in the well while it is traversing the well; this may readily be accomplished by attaching to the subsurface instrument bow springs which also bear on the well wall.

A particularly desirable way to record the signal produced by the radiation detector 84 is to employ a magnetic tape recorder, either within the instrument housing or remotely. The signal may be recorded as a function of position in the casing, or it may be recorded as a function of time. In the latter case, the position of the instrument 16 in the casing 14 as a function of time must also be recorded separately so that anomalies in the casing may be located by correlation with recorded anomalies in the radiation detector signal.

In the particular case where the apparatus is employed to inspect a pipe line, the tape recorder is preferably carried with the moving instrument as it passes through the pipe. The tape may then be played back for visual observation on an oscilloscope or for electronic analysis of the signal to locate anomalies. Also, in the case of pipe line inspection, it is desirable to provide a signal reference so that the rotating x-ray beam may be correlated with its position relative to the top of the pipe.

To accomplish this, an inclinometer can be provided, for example instead of the gyroscope 98 of FIG. 2. The output of this inclinometer is then compared with the phase of the deflecting voltages used in the electron gun to generate a signal indicative of the angular displacement of the x-ray beam relative to the top of the pipe. Reference markers along the length of the pipe may be provided in advance by placing magnetic or radioactive markers at intervals, so that they may be sensed by appropriate transducers in the instrument and their location recorded in correlation with the primary signal.

The apparatus of this invention may be employed to survey any environment in a manner somewhat analogous to that of a radar system employing a sweeping transmitted beam. Thus, this invention will have uses other than those described above in connection with the inspection of a well casing. Examples of such uses are pipeline inspections and tank inspections.

It will be understood that various changes in the details, materials, arrangements of parts, and steps, which have been described herein and illustrated in order to explain the nature of the invention, may be made by those skilled in the art within the principle and scope of the invention as expressed in the appended claims.

I claim:

1. A method of inspecting the interior of a metallic container for anomalies comprising:
    scanning at least a predetermined portion of the interior surface of a container with a source of x-rays which forms a beam that rotates at a predetermined rate along a conical surface about the longitudinal axis of the container;
    detecting the intensity of the x-rays scattered by said container and returned to the axis at a point spaced a predetermined distance from said source of x-rays;
    generating a signal proportional to said detected x-ray intensity; and recording selected portions of said signal in correlation with the angular displacement of said x-ray beam from a predetermined reference direction in a plane transverse to said axis and in correlation with the position of said source along said axis.

2. A method of inspecting the interior of a metallic container for anomalies comprising:
scanning at least a predetermined portion of the interior surface of a container with a source of x-rays which forms a beam that rotates at a predetermined rate in a conical surface about the longitudinal axis of the container;
detecting the intensity of the x-rays scattered by said container and returned to the axis at a point spaced a predetermined distance from said source of x-rays, generating a signal proportional to said detected x-ray intensity;
displaying said signal in correlation with the angular displacement of said x-ray beam from a predetermined reference direction in a plane transverse to said axis; and
recording selected portions of said signal in correlation with the angular displacement of said x-ray beam from said reference direction and the position of said source along the said axis.

3. A method of inspecting the internal surface of casing in cased wells comprising:
traversing a selected portion of the well with a x-ray source:
said source generating an x-ray beam which rotates along a conical surface about the longitudinal axis of the well at a predetermined rate,
generating a signal which indicates the angular displacement of said x-ray beam relative to a preselected reference direction;
detecting the intensity of x-rays scattered from the internal surface of said casing and returning to a point spaced a predetermined distance from said x-ray source, said detecting including generation of a signal proportionately related to said intensity;
transmitting said intensity signal and said directional signal to the surface of the earth;
displaying said intensity signal in correlation with said directional signal; and
recording selected portions of said display in correlation with the depth of said x-ray source.

4. Apparatus for inspecting the condition of casing in a cased well comprising:
a source of x-rays;
a detector of x-rays scattered from said casing;
said detector spaced a predetermined longitudinal distance from said source;
said detector being of a type which generates an electrical signal proportionately related to the intensity of said scattered x-rays;
means of transmitting said signal to the surface; and
means for displaying and recording said signal.

5. The apparatus of claim 4 in which said x-ray source generates a collimated beam of x-rays.

6. The apparatus of claim 5 in which said x-ray beam is directed at an acute angle relative to a plane transverse to said well.

7. The apparatus of claim 6 in which said x-ray beam rotates with a predetermined angular velocity around a line perpendicular to said transverse plane.

8. The apparatus of claim 7 further comprising a gyroscope oriented so that its stable axis is in said transverse plane and points in a predetermined geographic direction:
means interconnecting said gyroscope and said x-ray source:
said means adapted to generate a signal indicating the angular displacement of the projection of said x-ray beam on said transverse plane from said geographic direction,
means for transmitting said angular displacement signal to the surface of the earth;
means to display said scattered x-ray signal, in correlation with said angular displacement signal as a polar plot; and
means to record said signals in correlation with each other and with depth.

9. The apparatus of claim 8 in which the recorder means is adapted to provide successive records of said polar plots as a function of depth.

10. A method of inspecting the surface contour and condition of the wall of an uncased well, comprising:
traversing a selected portion of the well with an x-ray source:
said source generating an x-ray beam which rotates along a conical surface about the longitudinal axis of the well at a predetermined rate,
generating a signal which indicates the angular displacement of said x-ray beam relative to a preselected reference direction;
detecting the intensity of x-rays scattered from the wall of the well and returning to a point spaced a predetermined distance from said x-ray source, said detecting including generation of a signal proportionately related to said intensity;
transmitting said intensity signal and said directional signal to the surface of the earth;
displaying said intensity signal in correlation with said directional signal; and
recording selected portions of said display in correlation with the depth of said x-ray source.

11. A method of inspecting the condition of the wall of a pipeline comprising:
traversing a selected interior portion of the pipeline with an x-ray source:
said source generating an x-ray beam which rotates along a conical surface about the longitudinal axis of the pipeline at a predetermined rate,
generating a signal which indicates the angular displacement of said x-ray beam relative to a preselected reference direction;
detecting the intensity of x-rays scattered from the wall of the pipeline and returning to a point spaced a predetermined distance from said x-ray source;
said detecting including generation of a signal proportionately related to said intensity, and
recording selected portions of said intensity signal and said directional signal in correlation with length along the pipeline.

12. The method according to claim 11 wherein said preselected reference direction is the top of the pipeline.